United States Patent [19]

McGuffin

[11] Patent Number: 5,331,562
[45] Date of Patent: Jul. 19, 1994

[54] TERRAIN REFERENCED NAVIGATION-ADAPTIVE FILTER DISTRIBUTION

[75] Inventor: John T. McGuffin, Albuquerque, N. Mex.

[73] Assignee: Honeywell Inc., Minneapolis, Minn.

[21] Appl. No.: 822,031

[22] Filed: Jan. 16, 1992

[51] Int. Cl.$^5$ .............................................. G06F 15/50
[52] U.S. Cl. .................................. 364/449; 364/572; 342/63
[58] Field of Search ................ 364/449, 460, 724.19, 364/554, 571.05, 572, 516, 517, 456; 73/178 R; 342/63, 64

[56] References Cited

U.S. PATENT DOCUMENTS

| | | | |
|---|---|---|---|
| 4,144,571 | 3/1979 | Webber | 364/450 |
| 4,514,733 | 4/1985 | Schmidtlein et al. | 364/456 |
| 4,698,635 | 10/1987 | Hilton et al. | 364/456 |
| 4,829,304 | 5/1989 | Baird | 364/449 |
| 4,894,659 | 1/1990 | Andrews | 342/121 |
| 4,914,734 | 4/1990 | Love et al. | 342/64 |
| 4,954,837 | 9/1990 | Baird et al. | 364/458 |
| 5,047,777 | 9/1991 | Metzdorff et al. | 342/64 |
| 5,086,396 | 2/1992 | Waruszewski, Jr. | 364/449 |
| 5,105,372 | 4/1992 | Provost et al. | 364/572 |

OTHER PUBLICATIONS

The proceedings of the IEEE National Aerospace and Electronics Conference—NAECON, May 20–24, 1985 entitled *The AFTI/F16 Terrain–Aided Navigation System*, by D. D. Boozer, M. K. Lau, J. R. Fellerhoff, Sandia National Laboratories, Albuquerque, NM 87185, pp. 351–357.

Eric Skarman of SAAB Scandia AB Aerospace Division in a paper entitled *Kalman Filter For Terrain–Aided Navigation*, pp. 25.1–25.10.

Charles A. Baird and Mark R. Abramson in a paper entitled *A Comparison of Several Digital Map–Aided Navigation Techniques*, 1984, IEEE Journal, pp. 286–293.

J. R. Fellerhoff in a paper entitled *SITAN Implementation in the SAINT System*, 1986, IEEE Journal, pp. 89–95.

Carlos A. Bedoya in a paper entitled *Terrain Aided Navigation Algorithms Survey*, McDonnell Douglas Company B0697, Oct. 31, 1987, pp. 1–38.

Larry D. Hostetler and Ronald D. Andreas in a paper entitled *Nonlinear Kalman Filtering Techniques for Terrain–Aided Navigation*, IEEE Transactons on Automatic control, vol. AC-28, No. 3, Mar. 1983, pp. 315–323.

*Primary Examiner*—Thomas G. Black
*Assistant Examiner*—Michael Zanelli
*Attorney, Agent, or Firm*—Ronald E. Champion

[57] ABSTRACT

A terrain referenced navigation system utilizing a five-state kalman filter with a filter distribution based on a fixed grid approach. The five-state kalman filter utilizes an aircraft's altitude, East velocity, East acceleration, a South velocity and South acceleration. The database of the terrain referenced navigation system also utilizes a state variable indicating whether the aircraft is headed over water or land. The accuracy of the terrain referenced navigation system is improved by ignoring filter coefficients over water. The invention provides increased computational efficiency and accuracy by predicting inertial navigation parameters in the line of flight of an aircraft within a circle error of probability at predetermined filter locations within the circle error of probability. The difference between actual and predicted values are then used to compute a new estimate. The method is repeated until the removal of the most divergent filter at each pass results in a single best filter.

11 Claims, 3 Drawing Sheets

TERRAIN REFERENCED NAVIGATION-ADAPTIVE FILTER DISTRIBUTION

I. FIELD OF THE INVENTION

This invention relates to a method of reducing the number of kalman filters needed to analyze a field of kalman filter coefficients, and more particularly to compute the filter coefficients during a terrain referenced navigation system's acquisition mode.

II. BACKGROUND OF TERRAIN REFERENCED NAVIGATION

One prior art terrain aided navigation system is available from Sandia Labs. Sandia has created the Sandia Inertial Terrain-Aided Navigation (SITAN) flight-computer algorithm that produces a very accurate trajectory for low-flying, high-performance aircraft by combining outputs from a radar or laser altimeter, an inertial navigation system (INS), and a digital terrain elevation map. SITAN is a recursive, real time, terrain-aided navigation algorithm for use on fighter aircraft. The algorithm has been implemented in a popular microprocessor. The aircraft's position can be estimated within a 926 meter circle error of probability. A good description of the SITAN terrain aided navigation system can be found in the proceedings of the IEEE National Aerospace and Electronics Conference—NAECON, May 20-24, 1985 entitled *The AFTI/F16 Terrain-Aided Navigation System*, by D. D. Boozer, M. K. Lau, J. R. Fellerhoff, Sandia National Laboratories, Albuquerque, N. Mex. 87185.

SITAN utilizes Kalman filter algorithms to process geophysical measurements. The algorithm estimates errors in a flight path produced by an inertial navigation system following the equations given in the above-mentioned article.

The Kalman filter can be formed with the following state model: and the measurement $$\delta X_{k+1} = \phi \delta X_k + W_k$$
$$C_k = C(X_k) + V_k$$
$$= Z_k - h(.,.) + V_k$$

where
- $\delta X_k$ = INS error states to be estimated
- $\Phi$ = state-transition matrix for INS errors
- $X_k$ = states of INS and aircraft
- $C_k$ = ground clearance measurement
- $Z_k$ = altitude of aircraft
- h = height of terrain at position (.,.)
- $W_k$ = driving noise with $E(W_k)=0$ for all k and $E(W_k W_j^T) = Q_k \delta_{kj}$
- $V_k$ = measurement error with $E(V_k)=0$ for all k and $E(V_k V_j) = R_k \delta_{kj}$
- k = subscript denoting time k.

Since the measurement function c(x) is a nonlinear function of the states, the standard extended Kalman filter approach is used to obtain the measurement matrix, $$H_k = \frac{\partial c(X)}{\partial X} \bigg| X = X_k(-) = [-h_x, -h_y, 1, 0, 0 \ldots]$$

where $h_x$ and $h_y$ are the terrain slopes in the x and y directions of the map evaluated at $X_k(-)$, the predicted aircraft position just before a measurement is processed at time k. The first three states are taken to be the x position, y position, and altitude, respectively. At any time k, $$X = X_{INS} + \delta X$$

The state vector often used in a single filter implementation is $$\delta X = [\delta X \delta Y \delta Z \delta V_X \delta V_Y]^T$$

where $\delta X$, $\delta Y$, $\delta Z$, $\delta V_X$, and $\delta V_Y$ are errors in the X position, Y position, altitude, X velocity, and Y velocity, respectively. Other INS errors and states can also be included in $\delta X$ by using the proper $\Phi$.

Parallel SITAN was developed because the distance needed by SITAN to reach steady state becomes excessive as initial position errors (IPEs) approach several hundred meters. Parallel SITAN is a bank of extended Kalman filters that process identical altimeter measurements. After some updates, the filter with the minimum average weighted residual squared (AWRS) value is identified as having the correct position estimate. The AWRS value is defined by $$AWRS_{jth\ filter} = \frac{1}{n} \left[ \sum_{i=1}^{n} \frac{\Delta_i^2}{H_i P_i H_i^T + R_i} \right]_{jth\ filter}$$

where $\Delta_i$ is the residual at the ith update, n is the number of updates, and $HPH^T + R$ is the residual variance. Once the IPEs are reduced by the parallel filters, a single filter performs well, starting off essentially in steady state.

To implement parallel SITAN, the number and geometrical layout of the parallel filters needed to cover an IPE must be specified. A square, constant-spaced grid can be used to center the filters about the horizontal position indicated by the INS. Filters at and near the corners are then eliminated to reduce the number of filters. To further lighten the computational burden, three-state, instead of five-state, filters are often used in parallel SITAN with $$\delta X = [\delta X \delta Y \delta Z]^T$$

For both the single and parallel filter implementation, a least-squares plane fit to the map, known as stochastic linearization, is used to compute the slopes, $h_X$ and $H_Y$. Horizontal uncertainties $\sigma_X$ and $\sigma_Y$ from the error-covariance matrix, defined by $$P = E\left[\left(\delta X - \hat{\delta X}\right)\left(\delta X - \hat{\delta X}\right)^T\right]$$

and $$Diag\ P = [\sigma_X^2\ \sigma_Y^2\ \sigma_Z^2\ \sigma_{V_X}^2\ \sigma_{V_Y}^2]$$

are used to determine the size of the plane. Residuals from the plant fit, $RFIT_k$, are added to the measurement error variance, $R_k$, to ensure that the SITAN filter assigns less weight to the measurement when the plane fit is either very large or is over a rough area, thus adapting to local terrain.

SITAN has three basic modes: acquisition mode, lost mode and track mode.

Acquisition Mode

When one of the filters identifies a reliable estimate of true aircraft position, the track mode is entered. A single five state Kalman filter is initialized at the estimated acquired position. During track mode, the aircraft's position is estimated every 100 meters. SITAN employs a mode control logic concept to handle the transition from track to lost and from acquisition to track.

Acquisition mode is used to locate the aircraft's position within a circular region of uncertainty. The region of uncertainty is called the circular error of probability or CEP. In SITAN a 2100 meter initial position CEP is covered with 57 3-state Kalman filters centered on a grid whose initial positions are 525 meters apart.

The state acquisition filters include error states. They can estimate an aircraft's position under significant INS velocity errors. Each filter is initialized with position error estimates. To ensure that erroneous information is not employed to update the filters, none of the filters are updated if the pitch altitude is greater than 30 degrees or if the altimeter loses lock or the INS fails.

If the mode control logic of SITAN indicates that the aircraft has deviated from the 2363 meter search area, the lost mode is initiated. The lost mode ceases to provide position estimates for the aircraft, and the pilot has to update the inertial navigation before restarting SITAN.

Track Mode

Track mode estimates the position of the aircraft during flight. The five state tracking filter is used. The acquisition mode initializes the track filters. The track mode makes estimates of terrain slopes in rectangles surrounding the center of the aircraft position. The track filters are not updated during track mode unless the inertial navigation system, altimeter, and other flight data are valid.

Track mode is entered when the aircraft's actual position is close to the estimated one. In the event of a false fix, the track filter is set at the wrong position and the SITAN algorithm will proceed as if it was correct. This produces large errors in estimated positions. It is imperative that the probability of a false fix be kept low. The following is taken from the above-mentioned article in regard to the mode control logic of SITAN.

With the design for the acquisition, lost, and track modes as described above, the mode-control logic is needed to determine in which mode the algorithm should operate. When large aircraft position errors exist, it should choose the acquisition mode; with small errors, the track. The main parameter used in the mode-control logic for transition from acquisition to track is the AWRS. FIG. 7 shows a cross-section of a three-dimensional AWRS surface where AWRS is a function of the parallel filter positions $(X_j, Y_j)$. In the acquisition mode the parallel filters will tend to migrate to the relative minima of this surface.

To keep the parallel filters from migrating too far from their initial positions, a maximum of 128 updates is allowed. Four tests are performed after every 32 updates to determine if transition to the track mode is possible by selecting the acquisition filter with the minimum AWRS. Test 1 requires the selected filter to have an AWRS lower than a threshold value to ensure that the parallel filters are indeed over the correct aircraft position. If the parallel filters are configured over an area which does not include the true aircraft position, the global minimum of the AWRS curve is expected to shift upward. Test 2 requires contrast in the terrain, a sufficient difference between $AWRS_{min}$ and $AWRS_{max}$ to prevent transition to the track mode over very smooth areas such as water. Test 3, the false-fix test, requires that the minimum AWRS outside of an exclusion region, $AWRS^*_{min}$ does not compete with $AWRS_{min}$, where the size of the exclusive region is computed using $\sigma_X$ and $\sigma_Y$ of the selected filter. Statistically, as more updates are made, the separation between the global minimum and relative minima can be realized and still retain the same confidence level. Therefore, the required separation between $AWRS^*_{min}$ and $AWRS_{min}$ should be a function of $1/n$, where n is the number of updates. Test 4 requires the $\sigma_X$ and $\sigma_Y$ of the selected filter to be smaller than its initial value, 200 m, indicating that improvements have been made in estimating the aircraft's position during acquisition.

If track is not entered after 128 updates, a test for the lost mode is made. If $AWRS_{min}$ is greater than a threshold, the lost mode is entered and AFTI/SITAN will not produce any more estimates until the pilot updates the INS, which will automatically restart AFTI/SITAN in the track mode. If the lost condition is not met, the parallel filters are reset and acquisition starts over. This process continues until track or lost mode is entered.

Once in track, the track filter's $\sigma_X$ and $\sigma_Y$ are checked continuously while its AWRS is checked every 64 updates. If either the $\sigma$'s or the AWRS is too high, AFTI/SITAN switches back to the acquisition mode. The test on $\sigma$ prevents the track filter from using excessively large plane fits to maintain track after flying over smooth terrain for a long time. The AWRS test checks for unbelievable filter residuals.

III. BACKGROUND OF THE INVENTION

Terrain referenced navigation utilizes information from the geophysical characteristics of the earth to reference a position in space. The local terrain represents uniquely a location on the earth. This fact has been established empirically by the Sandia National Labs. A number of approaches to terrain referenced navigation have been attempted. All use a mapping representation of the terrain and a terrain navigation computer system to analyze and use the map.

As explained above, terrain aided navigation systems employ an acquisition mode and a track mode. Acquisition mode is used to determine the position of the aircraft on the earth relative to the terrain referenced navigation system data base representation of the earth. Track mode is used to continuously track and update the position of the aircraft in relation to the terrain. If the errors from track mode are great enough, the system automatically reverts to acquisition mode.

One of the motivations for use of a terrain referenced navigation system comes from the fact that pilots typically use a manual mode of terrain referenced navigation to initialize or reference the inertial navigation systems of the aircraft. Whether or not the inertial navigation system is a magnetic compass based system or a gyro base system, they both suffer from increasing error over time. To help minimize the error, pilots and navigators in aircraft perform what is called "way over flys" which are used to update the inertial navigation system over a known "way point".

The process is accomplished substantially as follows. A target is located by the navigator and the location of the target is entered into the inertial navigation system. The aircraft is flown over the target and as the plane passes over the target, that is, the way point, the inertial navigation system is keyed with the location. This process reorients and recalibrates the inertial navigation system. A terrain referenced navigation system performs substantially the same duty automatically and continuously.

The terrain referenced navigation system uses a data base of the terrain and the aircraft's radar altimeter to correlate the position of the aircraft in relation to the data base. The acquisition mode of a terrain referenced navigation system suffers from certain problems in the prior art. First, the prior art lacks sufficient processing power to process kalman filters for terrain referenced navigation data points with more than three states per data point. Second, the current terrain referenced navigation systems are limited to less than 100 data points which restricts the accuracy of the acquisition mode. Third, terrain referenced navigation systems of the prior art suffer from increasing errors when flying over water. A good example of a terrain referenced navigation system is Sandia National Lab's Sitan "SANDIA INERTIAL TERRAIN AIDED NAVIGATION".

The number of kalman filters used in terrain referenced navigation tends to be large. The method of the present invention minimizes the number of kalman filters needed in a terrain referenced navigation system. The method has a significant impact on the computation time and memory requirements needed to solve the terrain referenced navigation problem using the kalman filter technique.

Terrain referenced navigation utilizing a kalman filter approach, however, needs a certain number of filters distributed in the map to adequately solve the problem accurately. Prior art workers in the field of adaptive filter algorithms used for terrain referenced navigation used a fixed number of filters for the analysis of the map. This approach is most easy to implement if the problem is bounded, but it is not the most efficient in terms of processing time or memory. A bounded problem is one in which the area to be navigated is limited in size. For example, the area may represent a circle of a predetermined radius encompassing an aircraft.

FIG. 1 shows an example of an aircraft 10 following a line of flight 12 in approaching land from water employing the method of the prior art. The kalman filter distribution is shown by 14 to be a circle of radius R around the position to be navigated. In this case, position 16 is precisely at landfall on the line of flight 12 of the aircraft 10. The seashore 18 is irregular. However, the distribution of kalman filters themselves represented by cross hatches 20 in the circle of radius R are uniformly distributed in the circle such that they do not exceed a predetermined number of filter data points. The circle of radius R represents a position of uncertainty area in which data will be captured relative to ground targets and terrain in the circle. The adaptive kalman filter algorithm is used to analyze signal data from a radar on the aircraft 10.

While in acquisition mode, the aircraft's terrain referenced navigation system assumes that the center position 16 is the real position. The circle of radius R representing the circle error of probability CEP is extended from the center point 16. Kalman filter data points are regularly spaced in the circle error of probability. At each data point an altitude is obtained. The inertial navigation system assumes a latitude and longitude position for the center of the circle and all other data points relate associated latitude and longitude to the center point. The prior art uses a radar altimeter to calculate an elevation for each data point. For every data point an error term is computed which represents the predicted altitude from the terrain referenced navigation data base minus the actual altitude from the altimeter. Thus for every kalman filter data point position an error is determined. The kalman filter is then used on the data points and a coefficient is obtained for each data point. Estimated new latitudes and longitudes and heights are obtained from the filter. The process is repeated every 100 meters down the line of flight 12. The kalman filter adaptive algorithm sets the gain to be high if the error points are low and sets the gain to be small if the error points are high, thus trying to adapt to the increase in accuracy or decrease in accuracy of the system. Kalman filter coefficients are computed for north position, east position and altitude in prior art systems.

It can be seen by reference to FIG. 2 that the number of kalman filters required to process even a small area is quite large. This exacerbates the need for a high speed processor and a large amount of memory. It is, therefore, the motivation for this invention to reduce the number of kalman filters required to use the kalman filter adaptive algorithm in a terrain referenced navigation system by using an adaptive filter distribution technique and an adaptive filter deletion technique and to include directional acceleration data in the adaptive algorithm.

SUMMARY OF THE INVENTION

It is one object of this invention to process for each latitude and longitude the north heading, change from north heading, east heading and change from east heading and elevation data for each filter.

It is another object of the invention to reduce the computational load on the terrain referenced navigation processor by eliminating a diverging kalman filter at each pass.

It is yet another object of the invention to free a terrain referenced navigation processor for other non-filter processing related tasks.

It is yet another object of the invention to store the history of a filter's latitude and longitude and elevation for analysis by a navigational unit drift detection function.

The method of the invention utilizes an adaptive kalman filter distribution technique to represent terrain over landfall. The invention selects a best filter which meets certain predetermined test criteria. The kalman filters which fail the test criteria are not updated on the next pass of the algorithm. This method reduces the number of filters and the memory required to store the associated latitude and longitude data for each filter. The terrain referenced navigation memory used to store filter data are then deleted and then reclaimed for further use. This method also allows the processing of a larger number of filters arranged as a regular array of filters to more accurately estimate aircraft position.

Other objects, features and advantages of the present invention will become apparent to those skilled in the art through the description of the preferred embodiment, claims and drawings herein where like numerals refer to like elements.

DESCRIPTION OF THE PREFERRED EMBODIMENT

Figure 1:
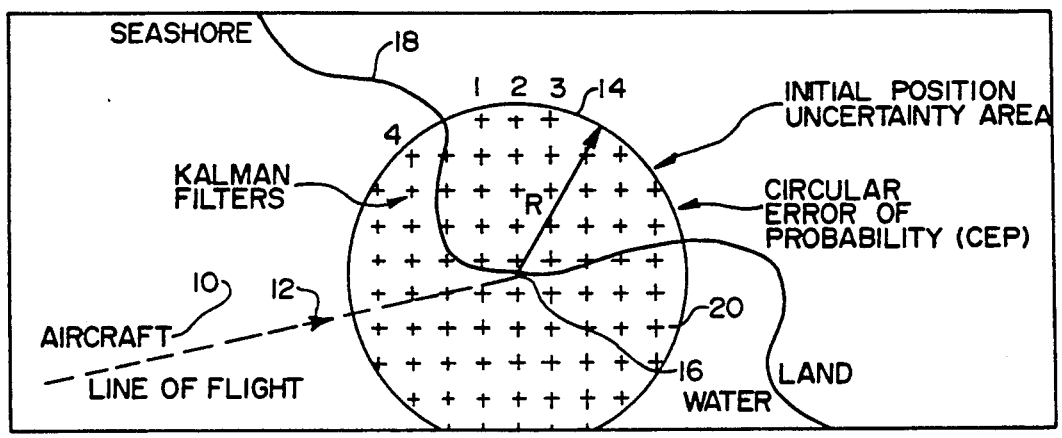
FIG. 1 shows a prior art terrain referenced navigation top down view of an aircraft following a line of flight.
Figure 2:
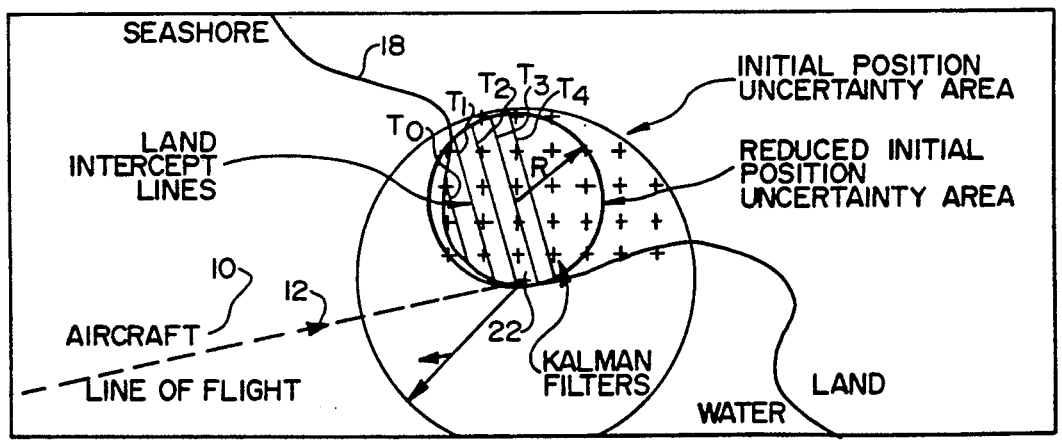
FIG. 2 shows a top down view of the method of the invention showing an aircraft on a line of flight utilizing the method of the invention.

FIG. 2 shows an aerial schematic of an aircraft 10 approaching a seashore 18 on line of flight 12 employing the method of the invention. As the aircraft 10 approaches land 18, the terrain referenced navigation acquisition mode algorithm will look ahead to identify probable land intercept points, each with an associated time, given aircraft speed and heading. Intercept point 22 is an example of one such location on the seashore. Due to instrumentation errors inherent in the aircraft avionics, the navigation system will only know the approximate location, latitude and longitude within an area of uncertainty defined by radius r. When instrumentation from the navigation system reports that land has been intercepted, the acquisition mode algorithm in the terrain referenced navigation system will only utilize those identified land intercept points which have the proper current time, and distribute the minimum number of filters required to cover all the land within the area of positional uncertainty.

Figure 3:
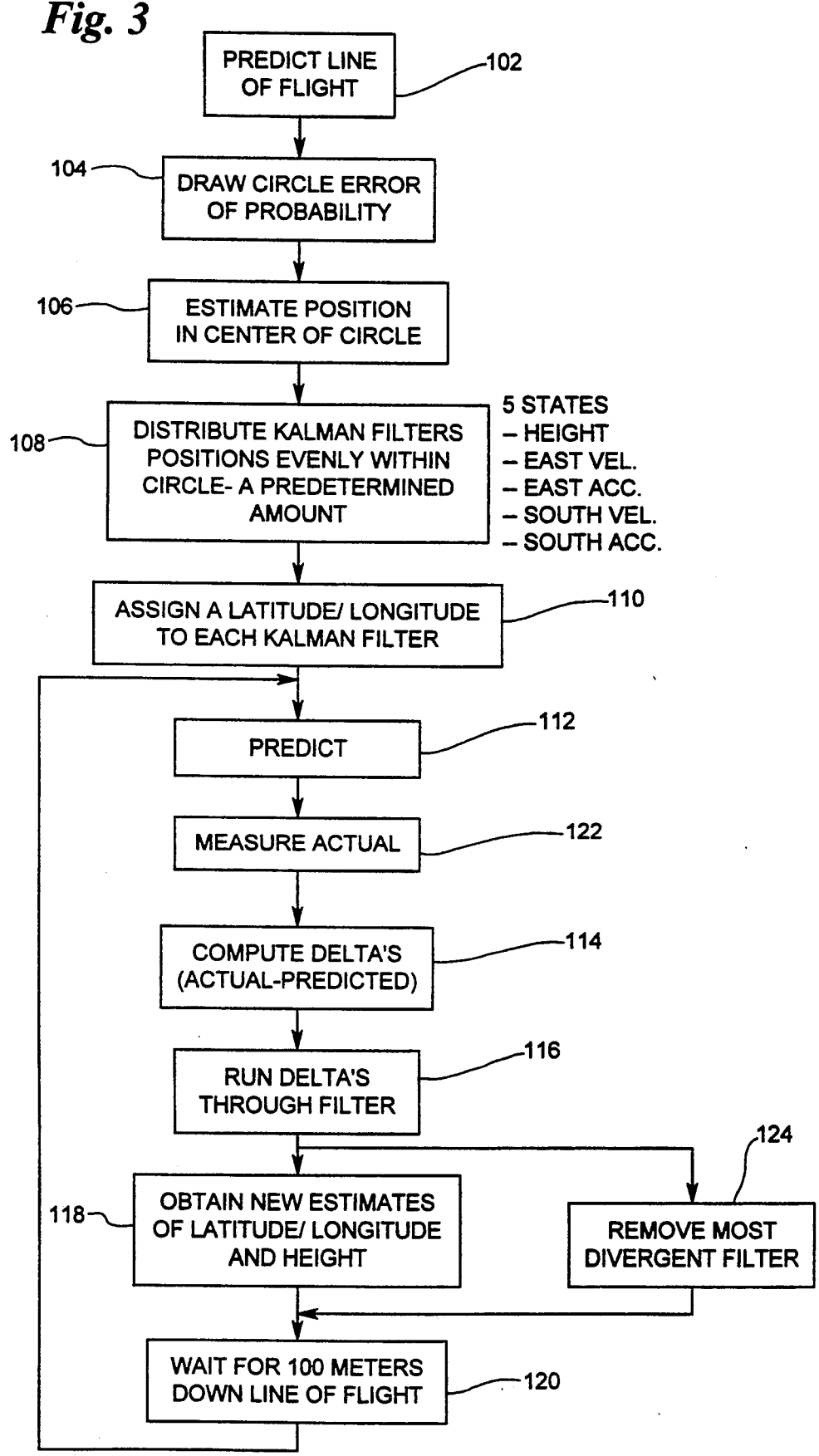
FIG. 3 shows a schematic flow diagram of a method of the invention to accomplish terrain reference navigation.

FIG. 3 shows a schematic flow diagram of the method of the invention used to accomplish terrain reference navigation. The method of the invention starts at process step 102 where the line of flight of the aircraft is predicted using a well known method. The line of flight will be used by the algorithm of the invention to develop the center point for the circle error of probability. The process then flows to step 104 where the circle error of probability is constructed and is referenced as that circle that includes those points with a likelihood of containing the position of the aircraft. The process then flows to step 106 where the position of the aircraft is defined to be in the center of the circle. This position is then used for further processing in the method of the invention. The process then flows to step 108 where kalman filter positions are distributed inside the circle error of probability. In the method of the invention the positions chosen for each kalman filter are constructed of a grid equally spaced in two dimensions such that they completely fill but do not extend past the circle error of probability. Each kalman filter point has an associated elevation data and associated East and South velocities and acceleration. All operations are carried out on the kalman filters distributed on a regular grid within the circle error of probability. The process then flows to step 110 where at each kalman filter position a latitude and longitude is assigned based on the center of the circle's assumed position. The process then flows to step 112 where at every latitude and longitude a radar altimeter measurement is made of the actual altitude over each point. Every position from the circle error of probability is assigned to a kalman filter point and an estimated altitude is read from the database. The process then flows to step 114 where the differences between the actual value and the predicted value are calculated. The process then flows to step 116 where the kalman filter is used upon the deltas. The process then flows to 118 where new estimates of latitude and longitude are created from the algorithm. The process then flows to 120 where the algorithm waits for the plane to fly 100 meters down the line of flight of the flight plan. After the plane has traveled 100 meters down the line of flight, the process then flows to 112.

In parallel, with the above steps the process flows from 116 to 124 where the most divergent filter is removed from calculation of the points in the circle error of probability. This filter deletion operation results in the filter with the least likelihood of being the actual position being deleted. It has been found empirically that the most divergent filter at any pass is never the filter which is used as the eventual position of the plane. It is safe to remove the divergent filter and decrease the processing power required to compute the kalman filters. This process reduces the processing power needed to run the terrain reference navigation method of the invention.

FIG. 2 shows the distribution of the modified filter positions. The circle required to cover the land intercept is much smaller than the prior art. The fact that the water provides no terrain information allows deletion of a large number of filters from the analysis of uncertainties.

By deleting a large number of filters from the analysis of the method of terrain referenced navigation, the error inherent in the position calculations is reduced. By deleting those kalman filter positions that correspond with a water position, the error due to locations of the water will not be propagated in the method. The prior art method utilized water positions which skewed the resulting estimates by the procedure over time.

Figure 4:
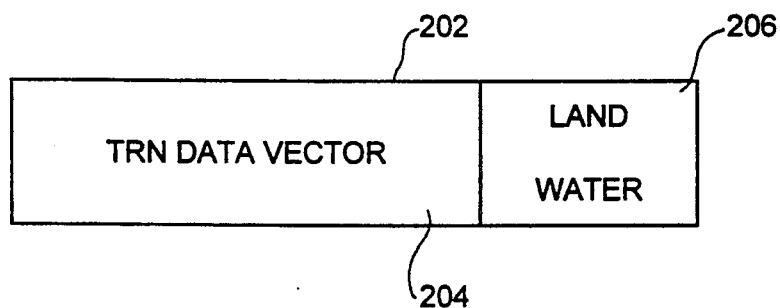
FIG. 4 shows a TRN database vector represented for each position in the circle error of probability.

FIG. 4 shows the method of designating a land or water terrain characterization. The method of the invention utilizes a bit 206 in the terrain reference navigation database vector 202 to indicate whether or not the aircraft using the TRN system is flying over land or water. The terrain reference navigation memory of the method of the invention contains enough data storage capacity to store the land/water bit 206. The remaining bits 204 are used to store other state values relating to terrain referenced navigation.

This invention has been described herein in considerable detail in order to comply with the Patent Statutes and to provide those skilled in the art with the information needed to apply the novel principles and to construct and use such specialized components as are required. However, it is understood that the invention can be carried out with specifically different equipment and devices, and that various modifications, both by equipment details and operating procedures, can be accomplished without departing from the scope of the invention itself.

What is claimed is:

1. A terrain referenced navigation system for an aircraft comprising:
   (a) digitally encoded grid means for generating a circle error of probability having a plurality of grid points, wherein each grid point includes a kalman filter having position parameters; and
   (b) processing means for removing the most divergent kalman filter from the circle error of probability, for updating the position parameters and for repeatedly removing subsequent most divergent kalman filters from the circle error of probability and updating position parameters until a last kalman filter is obtained.

2. The system of claim 1 wherein the circle error of probability grid points further comprise a memory means for storing altitude, an East or West velocity, an East or West acceleration, a South or North velocity, and a South or North acceleration.

3. The apparatus of claim 1 wherein the processing means further deletes those kalman filters that correspond with a water position prior to identifying and removing the most divergent kalman filter.

4. A terrain referenced navigation aircraft position determination method comprising the steps of:
 (a) predicting the line of flight of an aircraft and estimating a circle error of probability around the line of flight;
 (b) estimating a position in the center of the circle as the position of the aircraft;
 (c) distributing a plurality of kalman filter positions evenly throughout the circle error of probability and deleting those kalman filter positions from the circle error of probability which correspond with a water position;
 (d) assigning to each position of the circle error of probability five coordinates comprising altitude, an East or West velocity, an East or West acceleration, a South or North velocity, and a South or North acceleration;
 (e) assigning a latitude and longitude to each kalman filter position in the circle error of probability;
 (f) predicting the altitude, East or West velocity, East or West acceleration, South or North velocity, and South or North acceleration of the aircraft for each point in the circle error of probability;
 (g) measuring the actual altitude, East or West velocity, East or West acceleration, South or North velocity, and South or North acceleration at each point in the circle error of probability;
 (h) computing the difference between the actual and predicted altitude, East or West velocity, East or West acceleration, South or North velocity, and South or North acceleration at each point in the circle error of probability;
 (i) implementing a kalman filter algorithm on the five coordinates to estimate the latitude, longitude and altitude from the five coordinates;
 (j) using the estimate of latitude, longitude and altitude to determine a most divergent filter;
 (k) removing the most divergent filter from the circle error of probability; and
 (l) waiting for the line of flight to advance a predetermined distance and if advanced by the predetermined distance, repeating steps (a) through (l) until a last filter is obtained.

5. The method of claim 4 wherein the most divergent filter is designated as being that filter which is least likely to represent the actual aircraft position.

6. The method of claim 4 wherein the predetermined distance is about 100 meters.

7. A terrain referenced navigation system based on a kalman filter algorithm, wherein the terrain referenced navigation system comprises:
 (a) means for processing data according to a kalman filter algorithm including a plurality of kalman filters;
 (b) means for distributing the plurality of kalman filters in an even grid describing a circle error of probability having grid points wherein each grid point includes a kalman filter and one of the kalman filters is a most divergent filter; and
 (c) means for removing those kalman filters from the circle error of probability which correspond to a water position and for then removing a most divergent kalman filter from the circle error of probability wherein the most divergent kalman filter is removed from the circle error of probability during every pass of the algorithm.

8. The system of claim 7 wherein the circle error of probability grid points further comprise a memory means for storing altitude, an East velocity, an East acceleration, a South velocity, and a south acceleration.

9. A terrain referenced navigation aircraft position determination apparatus comprising:
 (a) means for predicting the line of flight of an aircraft and estimating a circle error of probability around the line of flight;
 (b) means for estimating a position in the center of the circle error of probability as the position of the aircraft;
 (c) means for distributing kalman filter positions evenly throughout the circle error of probability and for removing those kalman filters from the circle error of probability which correspond to a water position;
 (d) means for assigning to each position of the circle error of probability five coordinates comprising altitude, an East or West velocity, an East or West acceleration, a South or North velocity, and a South or North acceleration;
 (e) means for assigning a latitude and longitude to each kalman filter position in the circle error of probability;
 (f) means for predicting the altitude, East or West velocity, East or West acceleration, South or North velocity, and South or North acceleration of the aircraft for each point in the circle error of probability;
 (g) means for measuring the actual altitude, East or West velocity, East or West acceleration, South or North velocity, and South or North acceleration at each point;
 (h) means for computing the difference between the actual and predicted altitude, East or West velocity, East or West acceleration, South or North velocity, and South or North acceleration;
 (i) means for implementing a kalman filter algorithm on the five coordinates to estimate the latitude, longitude and altitude from the five coordinates;
 (j) means for determining a most divergent kalman filter based upon the estimate of latitude, longitude and altitude;
 (k) means for removing the most divergent kalman filter from the circle error of probability; and
 (l) means for waiting for the line of flight to advance a predetermined distance and if advanced by a predetermined distance, repeating steps (a) through (l) until a last kalman filter is obtained.

10. The apparatus of claim 9 wherein the most divergent filter is designated as being that filter which is least likely to represent the actual aircraft position.

11. The apparatus of claim 9 wherein the predetermined distance is about 100 meters.

* * * * *